No. 857,987. PATENTED JUNE 25, 1907.
A. FLAMACHE & J. GERNAERT.
FASTENING DEVICE FOR RAILS.
APPLICATION FILED MAY 15, 1906.

2 SHEETS—SHEET 1.

No. 857,987. PATENTED JUNE 25, 1907.
A. FLAMACHE & J. GERNAERT.
FASTENING DEVICE FOR RAILS.
APPLICATION FILED MAY 15, 1906.
2 SHEETS—SHEET 2.
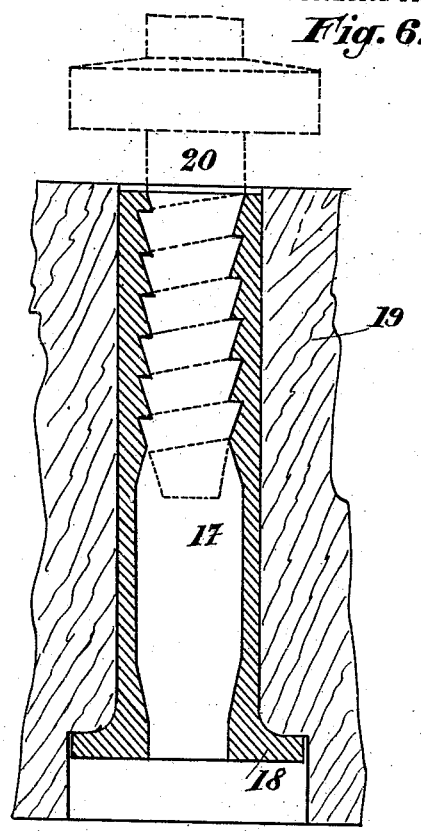
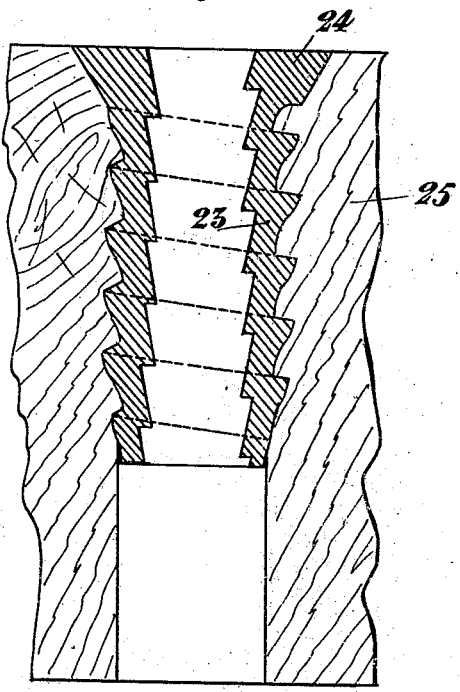
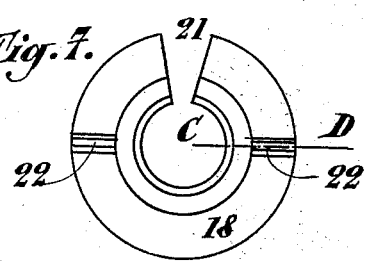
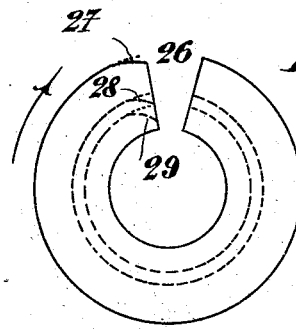
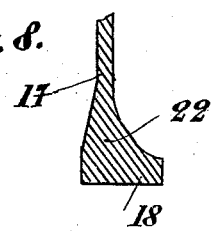
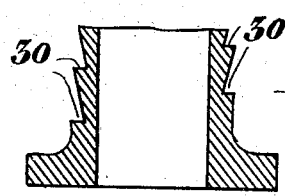

UNITED STATES PATENT OFFICE.

ARMAND FLAMACHE AND JULES GERNAERT, OF BRUSSELS, BELGIUM.

FASTENING DEVICE FOR RAILS.

No. 857,987.  Specification of Letters Patent.  Patented June 25, 1907.

Application filed May 15, 1906. Serial No. 316,950.

*To all whom it may concern:*

Be it known that we, ARMAND FLAMACHE, engineer, and JULES GERNAERT, engineer, subjects of the King of Belgium, residing in Brussels, Belgium, the first one Square Gutenberg 16, the second one Rue Ducale 13, have invented certain new and useful Improvements in Fastening Devices for Rails; and we do hereby declare the following to be a full, clear, and exact description of the invention, such as will enable others skilled in the art to which it appertains to make and use the same, reference being had to the accompanying drawings, and to letters or figures of reference marked therein, which form a part of this specification.

Fastening devices for rails should present the following advantages: They must be capable of great resistance, be rapidly and easily inserted, must be durable, inexpensive, require no supervision, and be absolutely secure. Furthermore, the sleepers must be capable of being used again when defective fastening devices have to be removed.

The present invention relates to a fastening device, consisting essentially in a yielding sleeve or socket, which provides in a sleeper or any other solid support an indestructible bed, which can receive a screw-bolt or any other similar piece, either with or without the interposition of a supplementary element.

Figure 1:
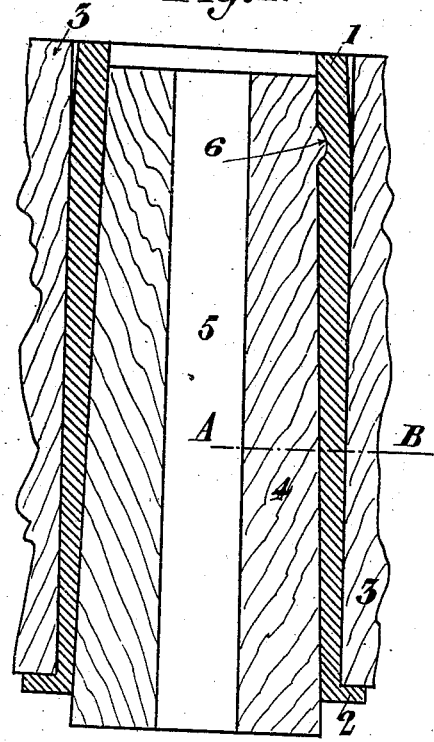
Figure 4:
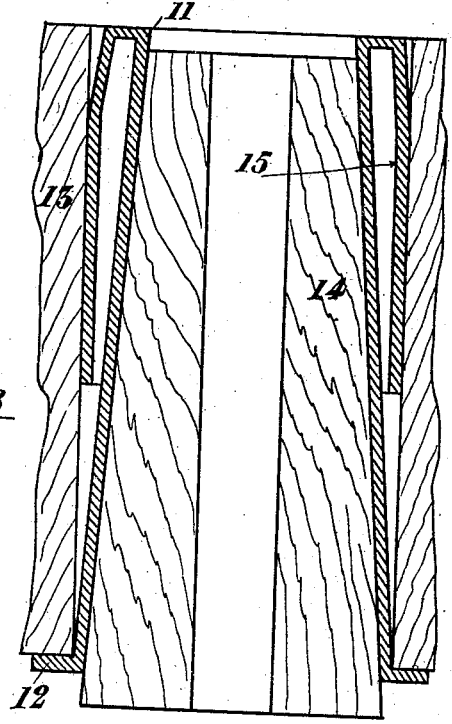
Figure 2:
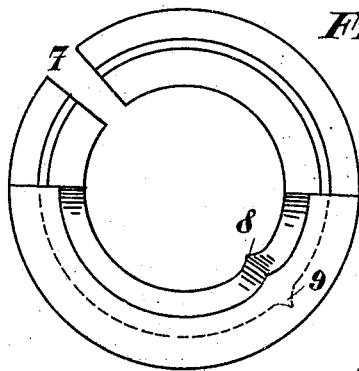
Figure 5:
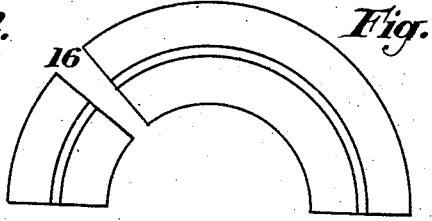
Figure 3:
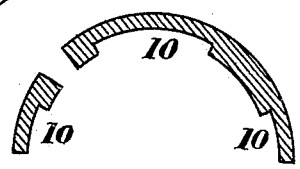

In order to make the invention quite clear, several embodiments of the invention are represented in the annexed drawings, in which:

Figure 1 represents a vertical axial section of a slotted sleeve or socket of any suitable material with solid, smooth face and a flange at the bottom. Fig. 2 represents, in its upper half, a plan view of the sleeve or socket shown in Fig. 1, and, in its lower half, a bottom view of the same sleeve or socket. Fig. 3 is a section on line A—B, of a special form of the sleeve or socket shown in Fig. 1. Fig. 4 is a vertical, axial section of a slotted stamped sleeve or socket, having a flange at the bottom. Fig. 5 is a plan view of the slotted, stamped sleeve or socket. Fig. 6 is a vertical, axial section through a slotted sleeve or socket with cylindrical outside, screw-threaded inside and having a flange at one of its ends. Fig. 7 is a plan view of a flange and a section through the sleeve or socket of Fig. 6. Fig. 8 is a section on line C—D (Fig. 7) of the sleeve or socket represented in Figs. 6 and 7. Fig. 9 is a vertical, axial section through a slotted sleeve or socket, with screw-threaded inside and outside. Fig. 10 is a plan view of the slotted sleeve or socket represented in Fig. 9. Fig. 11 is a vertical axial section through a slotted sleeve or socket with screw-threaded outside, and having a flange at one of its ends.

In Fig. 1: 1 is the slotted sleeve or socket. 2 is the flange of the sleeve or socket 1. 3 is the railway-sleeper, or any other support, into which the sleeve or socket is introduced. 4 is a conical core of wood or any other suitable material forced into the sleeve or socket 1. 5 is a cylindrical hole or bore made in the core 4, and having for its object to receive a screw bolt or any other fastening piece. 6 is a notch, which may be provided in the sleeve or socket 1 in order to maintain the core 4 more rigidly.

In Fig. 2: 7 is a longitudinal slot made in the sleeve or socket and insuring its resiliency which is the most important feature of our invention. 8 is a longitudinal inner rib, which may be provided in order to allow the core 4 to resist any action, even very strong ones, which would tend to cause it to rotate. 9 is an outer rib which may be provided to prevent the sleeve or socket from rotating in the piece 3 (Fig. 1).

In Fig. 3: 10, 10, 10 are longitudinal grooves which may be made in the sleeve or socket 1 in order to prevent the core 4 from rotating.

In Fig. 4. 11 is the slotted stamped sleeve or socket. 12 is the flange of the sleeve or socket 11. 13 is the sleeper or any other support in which the sleeve or socket is fitted. 14 is the conical core forced into the sleeve or socket 11. 15 is a curved outer wall giving the outer profile of the sleeve a general cylindrical form, while its inner profile is conical.

In Fig. 5: 16 is the longitudinal slot insuring the resiliency of the device.

In Fig. 6: 17 is the slotted sleeve or socket with cylindrical outside and having screw-threads on its inside. 18 is the strengthened flange of the sleeve or socket 17. 19 is the sleeper or any other support in which the sleeve or socket is fitted. 20 is the screw-bolt, screwed directly into the sleeve or socket 17.

In Fig. 7: 21 is the longitudinal slot insuring the resiliency of the device. 22, 22 are strengthening ribs increasing the resistance of the flange 18 against the forces due to traction.

In Fig. 8: 17 is the sleeve or socket. 18 is the flange. 22 is the reinforcement or strengthening rib.

In Fig. 9: 23 is the slotted sleeve or socket with screw-threaded inside and outside. 24 is an enlarged head preventing the sleeve or socket from dropping too far in the piece 25.

In Fig. 10: 26 is the longitudinal slot, which insures the resiliency of the device. 27, 28, 29 are slight deflections of the sleeve or socket preventing it from tearing fibers of the piece 25 when the sleeve is being screwed into this piece.

In Fig. 11: 30, 30 are the outer screw-threads of a slotted sleeve or socket.

The characteristics of the described device reside in the resiliency which is obtained by the use of resilient longitudinally slotted sleeves or sockets. Several forms of this device can be provided.

Four of these forms are indicated hereinafter by way of example.

1. Figs. 1 and 2 represent the form which consists in using a slotted sleeve or socket with cylindrical outside and conical inside, into which is forced a conical core of wood or any other suitable material, which receives a screw bolt or any other similar piece.

2. Figs. 4 and 5 represent the form which consists in using a slotted stamped sleeve or socket, with exterior cylindrical profile and conical inside, into which a conical core of wood or any other suitable material is forced, this core receiving a screw-bolt or any other similar piece.

3. Figs. 6, 7 and 8 represent the form which consists in using a slotted sleeve or socket, with cylindrical outside and the interior of which, being also cylindrical, is totally or partially screw-threaded. This sleeve or socket bears a strengthened flange which enables it to resist forces due to traction, even very considerable ones, transmitted by the screw-bolt. The sleeve or socket being somewhat shorter than the bed in which it is placed, it is possible to tighten it as much as desired. This insures for this form, all the advantages of the invention. This form differs from the former ones by the screw-bolt being screwed directly into the sleeve without the interposition of any core.

4. Figs. 9 and 10 represent a form which consists in using a sleeve or socket with screw-threaded inside and outside. This sleeve or socket bears a conical head which limits its dropping and it receives the screw bolt directly as in the form just described. This form differs from the preceding ones by the sleeve or socket being introduced from the top and by the absence of a resisting flange. This sleeve or socket is screwed into the sleeper.

Having described our invention, what we claim and desire to secure by Letters Patent is:

1. In a fastening device for rails, a resilient socket or sleeve longitudinally slotted from end to end.

2. In a fastening device for rails, a screw-threaded socket or sleeve longitudinally slotted from end to end.

3. In a fastening device for rails, a sleeve or socket, longitudinally slotted from end to end, a screw-thread on the inner side of the sleeve or socket, and a flange at one of the ends of the sleeve or socket.

4. In a fastening device for rails, a sleeve or socket, longitudinally slotted from end to end, a screw-thread on the inside of the sleeve or socket, a screw-thread on the outside of the sleeve or socket, an expanded tapering top part on the sleeve or socket, and off-sets on the opposite end of the sleeve or socket.

In testimony that we claim the foregoing as our invention we have signed our names in presence of two subscribing witnesses.

ARMAND FLAMACHE.
JULES GERNAERT.

Witnesses:
 E. GREY, Jr.,
 GREGORY PHELAN.